United States Patent
Mueller-Schindewolffs et al.

(10) Patent No.: US 12,305,538 B2
(45) Date of Patent: May 20, 2025

(54) GUIDE VANE RING AND ROTOR BLADE RING FOR A TURBOFAN ENGINE

(71) Applicant: MTU Aero Engines AG, Munich (DE)

(72) Inventors: Christoph Mueller-Schindewolffs, Munich (DE); Markus Brettschneider, Munich (DE); Guenter Ramm, Munich (DE); Franz Malzacher, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 18/300,400

(22) Filed: Apr. 14, 2023

(65) Prior Publication Data
US 2023/0332505 A1    Oct. 19, 2023

(30) Foreign Application Priority Data

Apr. 19, 2022    (DE) .......................... 102022109455.3

(51) Int. Cl.
*F01D 9/04*    (2006.01)
*F02K 3/06*    (2006.01)

(52) U.S. Cl.
CPC ................ *F01D 9/041* (2013.01); *F02K 3/06* (2013.01)

(58) Field of Classification Search
CPC ...... F01D 9/041; F04D 29/324; F04D 29/325; F04D 29/384; F04D 29/547; F02K 3/06; F05D 2220/36; F05D 2240/20
See application file for complete search history.

(56) References Cited

U.S. PATENT DOCUMENTS

| | | | |
|---|---|---|---|
| 5,192,190 A | 3/1993 | Ferleger et al. | |
| 5,203,676 A | 4/1993 | Ferleger et al. | |
| 5,277,549 A | 1/1994 | Chen et al. | |
| 5,354,178 A | 10/1994 | Ferleger et al. | |
| 5,480,285 A | 1/1996 | Patel et al. | |
| 5,524,341 A * | 6/1996 | Ferleger .................. | B21K 3/04 29/889.22 |
| 6,779,973 B2 | 8/2004 | Ito et al. | |
| 6,979,178 B2 | 12/2005 | Chandraker | |
| 8,708,660 B2 | 4/2014 | Micheli et al. | |
| 10,590,775 B2 | 3/2020 | Gallagher et al. | |

(Continued)

FOREIGN PATENT DOCUMENTS

| | | |
|---|---|---|
| EP | 0985801 B1 | 9/2004 |
| EP | 2458149 A1 | 5/2012 |

(Continued)

*Primary Examiner* — David E Sosnowski
*Assistant Examiner* — Maxime M Adjagbe
(74) *Attorney, Agent, or Firm* — LEYDIG, VOIT & MAYER, LTD.

(57) ABSTRACT

A guide vane ring and/or a rotor blade ring for a low-pressure turbine of an aircraft gas turbine of a turbofan engine includes a plurality of airfoils disposed consecutively in a direction of rotation. The plurality of airfoils includes a first airfoil and a second airfoil adjacent to the first airfoil in the direction of rotation. The first and second airfoils are disposed relative to each other such that a ratio e/t, viewed in a conical section, results from
  a smallest free flow cross-section e taken on the pressure side of the first airfoil from its trailing edge to a suction side of the second airfoil, and
  a pitch t of the airfoils,
such that e/t is less than 0.31, (e/t<0.31).

19 Claims, 3 Drawing Sheets

(56) References Cited

U.S. PATENT DOCUMENTS

| | | | |
|---|---|---|---|
| 11,480,063 B1* | 10/2022 | Miller | F01D 9/041 |
| 2009/0162204 A1 | 6/2009 | Aggarwala et al. | |
| 2011/0206498 A1 | 8/2011 | McCooey | |
| 2012/0156047 A1 | 6/2012 | Huebner | |
| 2012/0183411 A1* | 7/2012 | Haller | F01D 9/041 |
| | | | 416/243 |
| 2012/0294722 A1 | 11/2012 | Zeng et al. | |
| 2013/0022473 A1 | 1/2013 | Tran | |
| 2016/0215788 A1 | 7/2016 | Froebel et al. | |
| 2016/0273547 A1* | 9/2016 | Gallagher | F04D 29/324 |
| 2017/0130587 A1 | 5/2017 | Bhaumik et al. | |
| 2020/0102829 A1 | 4/2020 | Haller | |
| 2020/0156768 A1* | 5/2020 | Goodhand | B64C 7/02 |
| 2020/0157943 A1* | 5/2020 | Goodhand | B64D 27/24 |
| 2020/0400099 A1* | 12/2020 | Bemment | F02K 3/06 |

FOREIGN PATENT DOCUMENTS

| | | | |
|---|---|---|---|
| EP | 3051142 A1 | 8/2016 | |
| EP | 2880280 B1 | 10/2019 | |

* cited by examiner

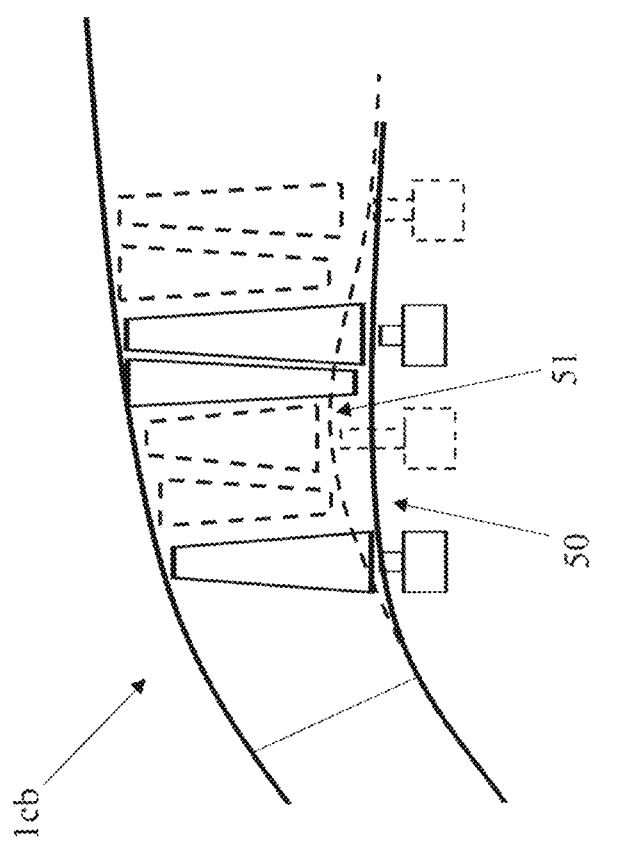

GUIDE VANE RING AND ROTOR BLADE RING FOR A TURBOFAN ENGINE

CROSS REFERENCE TO RELATED APPLICATIONS

This application claims benefit to German Patent Application No. DE 102022109455.3, filed on Apr. 19, 2022, which is hereby incorporated by reference herein.

FIELD

The present invention relates to a guide vane ring and a rotor blade ring for a low-pressure turbine of an aircraft gas turbine of a turbofan engine.

BACKGROUND

The present subject matter is directed to the low-pressure turbine of a turbofan engine, the rotor blade rings of which are coupled to the fan via a gearbox. Such an engine is also referred to as a geared turbofan engine (GTF engine). In operation, the rotor blade rings then rotate at a higher speed relative to the fan. In the present context, a "low-pressure turbine" refers to a turbine that is located furthest upstream in a direction of flow and downstream of a combustion chamber. A low-pressure turbine can drive a middle and/or innermost shaft.

SUMMARY

In an embodiment, the present disclosure provides a guide vane ring and or a rotor blade ring for a low-pressure turbine of an aircraft gas turbine of a turbofan engine that includes a plurality of airfoils disposed consecutively in a direction of rotation. The plurality of airfoils includes a first airfoil and a second airfoil adjacent to the first airfoil in the direction of rotation. The first and second airfoils are disposed relative to each other such that a ratio e/t, viewed in a conical section, results from
- a smallest free flow cross-section e taken on the pressure side of the first airfoil from its trailing edge to a suction side of the second airfoil, and
- a pitch t of the airfoils,
such that e/t is less than 0.31, (e/t<0.31).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 shows an axial section of a low-pressure turbine for illustrating a horizontal hub contour.

DETAILED DESCRIPTION

Figure 1:
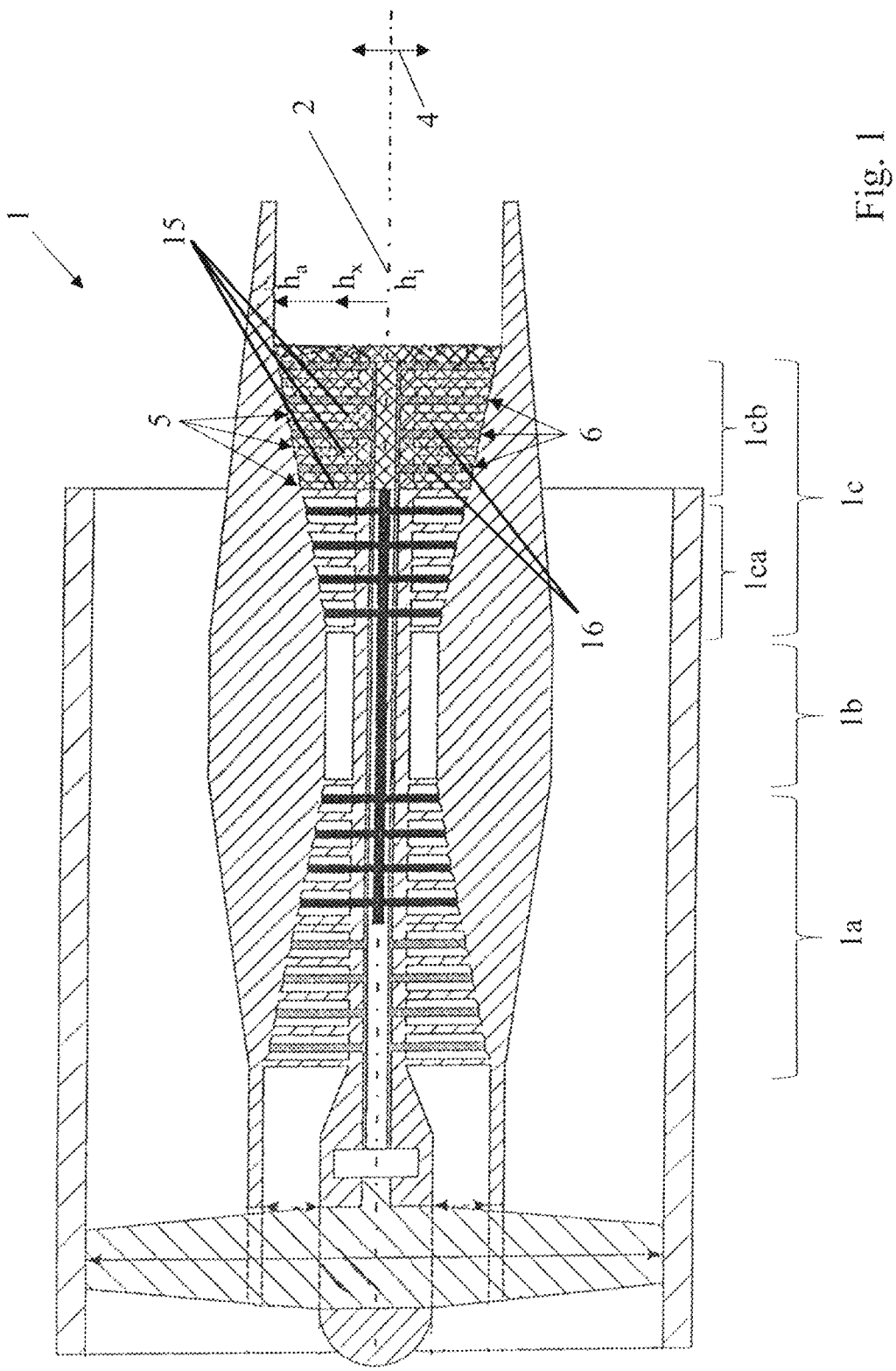
FIG. 1 shows a schematic illustration of a turbofan engine in an axial section.

The present invention relates to the technical problem of specifying advantageous vane/blade rings (or airfoil rings) for a low-pressure turbine of a turbofan engine.

For both guide and rotor airfoil rings, there is a ratio e/t resulting from
- a smallest flow cross-section e (taken in a respective conical section from the trailing edge of one airfoil as the shortest connecting line to the suction side of the neighboring airfoil located on the pressure side, see below in detail), and
- a pitch t of the airfoils,
less than 0.31, therefore e/t<0.31 applies.

Furthermore, specific stagger angles $\gamma$ are set for each of the airfoils, namely, if these are
- in the case of guide vanes, under 45°, $\gamma_v$<45°, and
- in the case of rotor blades, as a function of a respective radial position $h_x$ at $\gamma_b$<62°−(32°·$h_x$).

The radial position $h_x$ ranges by definition from 0 at the radially inner end of the airfoil to 1 at the radially outer end thereof, $h_i$=0 and $h_a$=1. In other words, the value of $h_x$ results in each case as the quotient of the distance of the respective radial position from the radially inner end and the radial airfoil height h. Consequently, $h_x$ takes values in the interval [0; 1] and the bracket term of the above equation goes radially inward toward 0 and radially outward toward 32°. The stagger angle $\gamma_b$ must therefore be <62° radially inward and <30° radially outward.

With these geometric boundary conditions, the airfoils can be optimized for a particular design, e.g. for a largely horizontal, i.e., considered in axial section, essentially axis-parallel hub contour of the annulus. This can be advantageous, for example, in that the rotor disks can then be compact and thus also weight-reduced. In addition, there is then at least no need to compensate for excessively large radial distances between the hub radii of the individual rotor blades. Conversely, however, this requirement profile can result in, for example, enlarged flow cross-sections and reduced axial flow velocities. Due to the horizontal hub contour, the airfoils can become comparatively long, which requires or results in low downstream angles.

However, a reduction in the specific axial flow velocity in GTF engines developed in the future may also result, for example, from increased rotational speeds of the low-pressure turbine compared to previous generations, whereby the higher rotational speeds, for example, may improve the efficiency level. In summary, there may be various boundary conditions (horizontal hub contour and/or higher rotational speeds) which, taken as a whole, can improve the efficiency, but, which imply special requirements for the blading of the low-pressure turbine. Due to the low axial flow velocity, for example, the circumferential component can become large and individual blade rows can accelerate strongly and flow off with high twist. This, because of the low axial flow velocity, can lead to very small downstream angles (relative to the direction of rotation). The present airfoil rings are optimized for these boundary conditions, with different geometrical requirements arising in detail for the guide vanes and the rotor blades.

With a view to the small downstream angles, according to the invention, very small stagger angles $\gamma$ are set in the airfoil rings. In the case of the guide vanes, the stagger angle $\gamma_v$ can be essentially constant over the radial height; preferably, the stagger angle is $\gamma_v$<45° over the entire vane height. In the case of the rotor blades, on the other hand, the stagger angle $\gamma_b$ is set with radial progression. Furthermore, the aerodynamic stagger angle $\beta_2$ can be defined and/or illustrated very well via the ratio e/t, both for the guide vane ring and the rotor blade ring (e/t<0.31).

Preferred embodiments can be found in the dependent claims and the entire disclosure, whereby in the presentation of the features, a distinction is not always made in detail between aspects of the apparatus and aspects of the method and/or of the use; in any case, implicitly, the disclosure is to be read with regard to all categories of the claims. If, for example, the advantages of the airfoil rings in certain operating conditions are described, this is at the same time to be read as a disclosure of a corresponding operating method and/or the corresponding use.

The specifications "axial", "radial" and "circumferential", as well as the associated directions (axial direction etc.), refer to the longitudinal axis of the engine and/or of the low-pressure turbine, which typically coincides with the axis of rotation of the rotor blade ring. The stagger angle $\gamma$, as well as the quantities e and t, is considered in a (common) respective conical section, in particular by a leading and trailing edge position at respective corresponding radial duct height, e.g. at 50% of the radial duct height in each case, i.e. in a conical or frustoconical surface (which is rotationally symmetric about the longitudinal axis and preferably follows a slope of the annulus) as sectional area. The conical surface thereby preferably includes the linear connecting line from a respective radial leading edge position, for example at 10%, 25%, 50%, 75% or 90% of the radial leading edge extent, to the respective corresponding trailing edge position, for example at 10%, 25%, 50%, 75% or 90% of the radial trailing edge extent, respectively. The stagger angle $\gamma$ is taken on the conical surface and in each case on the pressure side of the respective airfoil, between its chord and the direction of rotation.

The values or ranges defined in the present disclosure for said quantities, such as e, t, $\gamma$, $\gamma_v$, $\gamma_b$, $\beta_1$, $\beta_2$, may be present in some embodiments in one conical section through the leading and trailing edges at one (same) respective radial extent, e.g., at 50%, in some embodiments in several different ones, and/or in some embodiments in all conical sections through the and/or all respective leading and trailing edge positions (at the respective radial extents). This also applies in the following description, where, for better understanding, it is now only referred to as "in one (respective)/in the conical section".

The pitch t is taken in a respective conical section between the trailing edges of respective next adjacent airfoils, i.e. in the direction of rotation as the distance between the trailing edges. Also in the case of the free flow cross-section e, two next adjacent airfoils are considered in the conical section, the free flow cross-section e then being taken on the pressure side of one airfoil, "first" airfoil in the terminology of the claims, away from its trailing edge to the suction side of the next adjacent airfoil on the pressure side, "second" airfoil in the terminology of the claims. Specifically, this cross-section is determined to describe the shortest distance from the trailing edge of the first airfoil to the suction side surface of the second airfoil.

In the context of the present disclosure, reference is made to a "respective" airfoil and/or the "first" and "second" airfoils, which generally does not necessarily imply that all airfoils of the respective ring are designed accordingly. Preferably, at least the majority (>50%) of the airfoils of the respective ring fulfills the criteria, and, particularly preferably, all airfoils are designed accordingly. For example, all the next adjacent airfoils around the circumference can then, paired as first airfoil and second airfoil, meet the criteria according to the claim.

A possible lower limit of the stagger angle $\gamma_v$ can be, for example, 15° in the case of the guide vanes, $\gamma_v > 15°$. In the case of the rotor blades, a lower limit of the stagger angle $\gamma_b$ can be, for example, 15° ($\gamma_b > 15°$). The ratio e/t can be greater than 0.15, for example, e/t>0.15.

According to a preferred embodiment, which may be of interest in the case of the guide vanes and/or the rotor blades, a respective airfoil has a metal angle $\beta_1 > 50°$ at least in a radially outer region at its leading edge. The angle $\beta_1$ is taken at the leading edge in the conical section between a tangent to the skeletal line and the direction of rotation, toward the suction side of the airfoil. The degree range specified above (>50°) is achieved in any case in the radially outer 5% of the radial airfoil height h, i.e. when 0% lies radially inward and 100% radially outward, between 95% and 100%.

In a preferred embodiment, the metal angle of the respective airfoil remains less than 85° in the radially outer 5% of the airfoil height, $\beta_1 < 85°$. In general, this upper limit and the lower limit discussed in the preceding paragraph may be provided independently of each other, preferably the metal angle $\beta_1$ lies in a corresponding range, $50° < \beta_1 < 85°$.

According to a preferred embodiment, a respective airfoil ring is designed for an ADP speed of at least eight thousand revolutions per minute. A possible upper limit, which may generally also be of interest independently of the lower limit and is intended to be disclosed, lies at twelve thousand revolutions per minute. The appropriate design may involve both the rotor blade ring, which then rotates accordingly during operation, and the guide vane ring, which is adapted for use in conjunction with a rotor blade ring that rotates accordingly at high speed during operation. The ADP speed is the speed at the aerodynamic design point (ADP), i.e. it is achieved in operation under cruise conditions, for example.

According to a preferred embodiment, the mean radius $r_m$ of the respective airfoil ring is at least 0.15 m, preferably at least 0.19 m. Possible upper limits, which in turn can generally also be of interest independently of the lower limit and are intended to be disclosed, are in the order of mention, increasingly preferred at 0.6 m, 0.5 m or 0.4 m or 0.37 m, particularly preferred is $0.19\ m \leq r_m \leq 0.37\ m$. The mean radius $r_m$ is taken from the longitudinal axis in the radial direction to the radial center of the gas duct; if the radial center on the inlet and outlet sides of the respective airfoil ring lies at different radial positions, an average value formed from the inlet and outlet sides is used.

A preferred embodiment relates to the aspect ratio in the respective grid, i.e. the ratio of radial airfoil height h to axial grid width b. This can be at least 2, for example, with possible upper limits (independent of this) of 5.5 and in particular 4.6, h/b≤5.5 or h/b≤4.6.

According to a preferred embodiment, the downstream angle $\beta_2$ of a respective airfoil is at most 18°, in particular at most 17°. Reference is made to the comments at the beginning on the low downstream angles. Possible lower limits are 14° and/or 15°, so $15° \leq \beta_2 \leq 17°$ may be particularly preferred. The downstream angle $\beta_2$ in the conical section between a perpendicular to the shortest connecting distance from the trailing edge of the respective airfoil to the suction side of the neighboring airfoil on the pressure side is taken at the trailing edge of the respective airfoil and in the direction of rotation.

The invention also relates to a low-pressure turbine of a turbofan engine comprising a guide vane ring and/or a rotor blade ring, preferably both. In a preferred embodiment, the guide vane ring and the rotor blade ring then have a horizontal hub contour, i.e. the hub has a substantially axis-parallel progression considered in an axial section (sectional plane including longitudinal axis), i.e. for example a compensation straight line laid in the section in the hub is tilted by less than 10°, 5°, 3° or 1° to the axial direction.

The invention further relates to a turbofan engine that has a fan in addition to the low-pressure turbine. The fan is coupled to the low-pressure turbine via a gearbox, so that during operation the low-pressure turbine, i.e. its rotor blade ring and/or rings, rotate faster than the fan.

Further, the invention relates to the use of the low-pressure turbine or the turbofan engine, wherein the rotor blade ring and/or rings of the low-pressure turbine are operated at an ADP speed of at least eight thousand revolutions per minute. A possible upper limit lies at twelve thousand revolutions per minute, cf. also the comments above.

In the following, the invention will be explained in more detail by means of an exemplary embodiment, whereby the individual features may also be essential to the invention in other combinations within the scope of the corresponding claims, and no further distinction will be made in detail between the different categories of claims.

FIG. 1 shows a turbofan engine 1 in a schematic axial section, i.e. viewed in a sectional plane containing the longitudinal axis 2. Perpendicular to the axis are the radial directions 4. Functionally, the turbofan engine 1 is divided into a compressor 1a, a combustion chamber 1b and an aircraft gas turbine 1c, the latter comprising a high-pressure turbine 1ca and a low-pressure turbine 1cb. In operation, intake air is compressed in compressor 1a, burned in the downstream combustion chamber 1b with added fuel, and the resulting hot gas is then expanded in the aircraft gas turbine 1c. In the low-pressure turbine 1cb, guide vane rings 5 and rotor blade rings 6 are referenced as examples. The former each have a plurality of guide vanes 15 distributed circumferentially, and the latter each have a plurality of rotor blades 16 (the circumferential arrangement is not recognizable in detail in the axial section).

Figure 2:
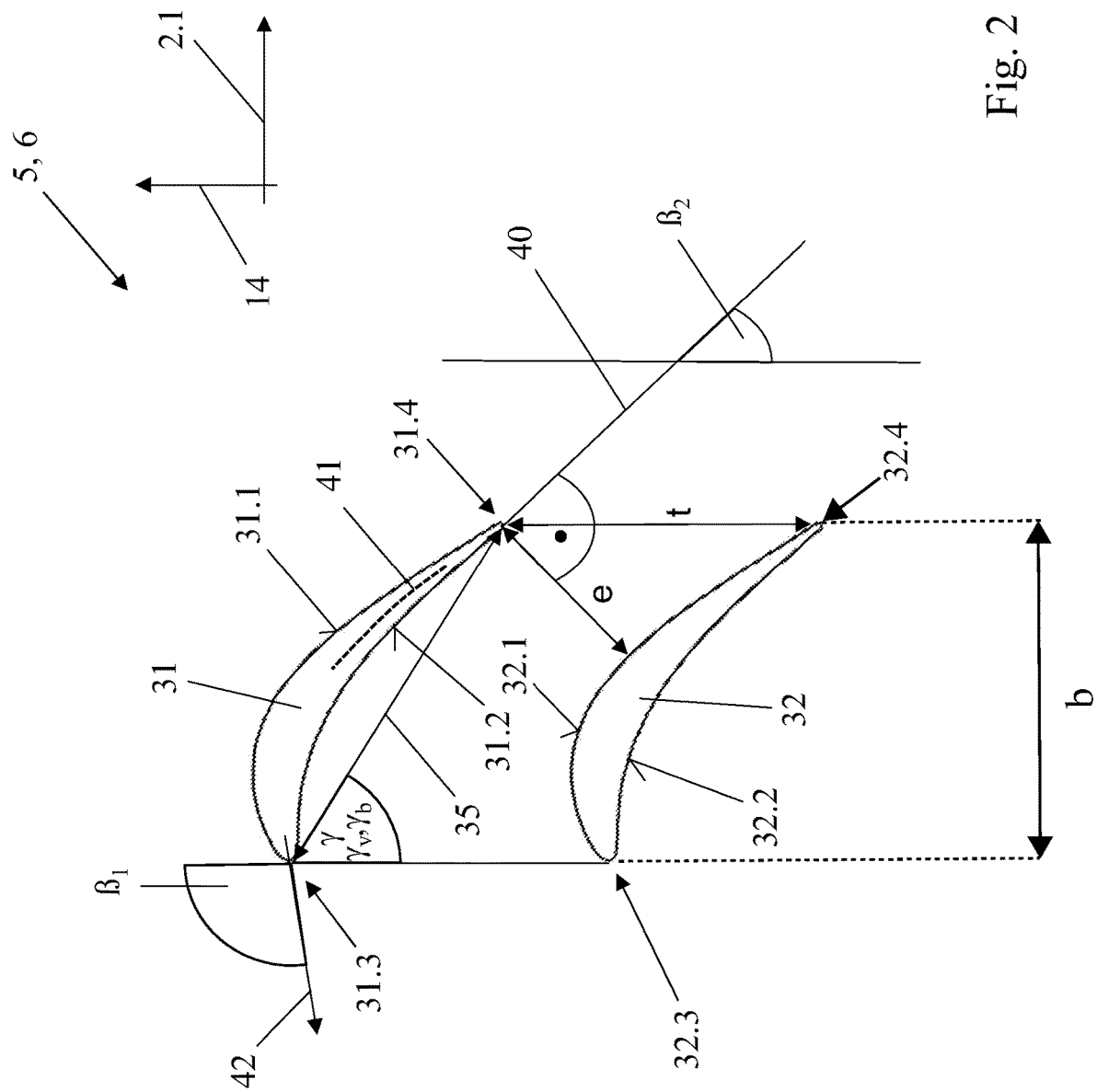
FIG. 2 shows a section of an airfoil ring according to the invention in a conical section.

FIG. 2 shows a section of an airfoil ring 20, which can be both a guide vane ring 5 and a rotor blade ring 6. For orientation purposes, a direction of rotation 14 is shown in addition to an axial direction 2.1.

In detail, FIG. 2 shows a first airfoil 31 and a next adjacent, second airfoil 32. The airfoils 31, 32 each have a suction side surface 31.1, 32.1 and a pressure side surface 31.2, 32.2, these side surfaces each extending between leading edge 31.3, 32.3 and trailing edge 31.4, 32.4. A stagger angle $\gamma$ is further shown for the first airfoil 31, which is taken on the pressure side of the airfoil between the chord 35 and the direction of rotation 14.

In the case of the guide vane ring 5, the stagger angle $\gamma_v < 45°$ is set and can be substantially constant over the radial vane height. With the guide vane ring, the stagger angle is set as a function of a radial position $h_x$, cf. FIG. 1 for illustration. In particular, the stagger angle $\gamma_b$ can be $<62°$ radially inward ($h_i$), while it can be $<30°$ radially outward $(h)._a$ Furthermore, a ratio e/t<0.31 is set for the airfoils 31, 32. Here, t corresponds to the pitch, i.e. the distance taken between the trailing edges 31.3, 32.3 in the direction of rotation 14. The smallest flow cross-section e results from the pressure side of the airfoil 31 from its trailing edge 31.4 to the suction side surface 32.1, namely as the shortest connecting distance in the conical section.

A metal angle $\beta_1$ lies between 50° and 85°, which is taken on the suction side between a tangent 42 to the skeleton line 41 and the direction of rotation 14. The downstream angle $\beta_2$ corresponds to the angle which can be taken on the pressure side between the perpendicular 40 to the shortest connecting section e at the trailing edge 31.4 and the direction of rotation 14. The downstream angle $\beta_2$ is around 16°.

FIG. 3 shows a low-pressure turbine 1cb in an axial section (section plane including the longitudinal axis 2 according to FIG. 1). The solid line illustrates an essentially horizontal hub contour 50, which can be realized with the blade design described above and can be advantageous, for example, in terms of a compact and weight-reduced structure, cf. the introduction to the description in detail. For comparison, a conventional hub contour 51 is also shown with dashed lines.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS turbofan engine 1
compressor 1a
combustion chamber 1b
aircraft gas turbine 1c
high-pressure turbine 1ca
low-pressure turbine 1cb
longitudinal axis 2
axial direction 2.1
radial directions 4
guide vane rings 5
rotor blade rings 6
direction of rotation 14
guide vanes 15
rotor blades 16
airfoil ring 20
first airfoil 31
second airfoil 32
suction side surface 31.1, 32.1
pressure side surface 31.2, 32.2
leading edge 31.3, 32.3
trailing edge 31.4, 32.4
chord 35 perpendicular 40
tangent 42
skeleton line 41
horizontal hub contour 50
conventional hub contour (for illustration) 51
metal angle $\beta_1$
downstream angle $\beta_2$
pitch t
staggering $\gamma$
free flow cross-section e
airfoil height h
grid width b
mean radius $r_m$

The invention claimed is:

1. A guide vane ring for a low-pressure turbine of an aircraft gas turbine of a turbofan engine, the guide vane ring comprising:
a plurality of airfoils disposed consecutively in a direction of rotation, each airfoil being disposed with a stagger angle $\gamma_v$ less than 45° ($\gamma_v$<45°) over the entire height of the respective airfoil, the stagger angle $\gamma_v$ being taken on a pressure side of each airfoil between a chord and the direction of rotation,
wherein the plurality of airfoils comprises a first airfoil and a second airfoil adjacent to the first airfoil in the direction of rotation, the first and second airfoils being disposed relative to each other such that a ratio e/t, viewed in a conical section, results from:
a smallest distance e taken on the pressure side of the first airfoil from a trailing edge of the first airfoil to a suction side of the second airfoil, and
a pitch t of the airfoils,
such that e/t is less than 0.31 (e/t<0.31).

2. The guide vane ring according to claim 1, wherein at least one airfoil has a metal angle $\beta_1$, which for the at least one airfoil, at least in a radially outer 5% of a radial airfoil height h at a leading edge is greater than 50° ($\beta_1$>50°).

3. The guide vane ring according to claim 1, wherein at least one airfoil has a metal angle $\beta_1$ which for the at least one airfoil, at least in a radially outer 5% of a radial airfoil height h at a leading edge, is smaller than 85° ($\beta_1$<85°).

4. The guide vane ring according to claim 1, wherein the guide vane ring is adapted for use with a rotor capable of an ADP speed of at least 8000 and at most 12000 rpm.

5. The guide vane ring according to claim 1, in which a mean radius $r_m$ is at least 0.15 m and at most 0.6 m.

6. The guide vane ring according to claim 1, wherein a ratio h/b obtained with a radial airfoil height h of a respective airfoil to an axial grid width b is at least 2 and at most 5.5 (2≤h/b≤5.5).

7. The guide vane ring according to claim 1, wherein at least one airfoil has at a trailing edge, of the at least one airfoil, at least at a respective duct height of at least 10% of the radial duct extent, a downstream angle $\beta_2$ which is at least 14° and at most 18° (14°≤$\beta_2$≤18°).

8. A low-pressure turbine of an aircraft gas turbine of a turbofan engine, the low-pressure turbine comprising the guide vane ring according to claim 1.

9. The low-pressure turbine according to claim 8, wherein the guide vane ring has a horizontal hub contour.

10. A turbofan engine, the turbofan engine comprising:
a fan;
the low-pressure turbine according to claim 8; and
a gearbox coupling the fan to the low-pressure turbine.

11. A rotor blade ring for a low-pressure turbine of an aircraft gas turbine of a turbofan engine, the rotor blade comprising:
a plurality of airfoils disposed consecutively in a direction of rotation,
wherein each airfoil is disposed with a stagger angle $\gamma_b$, which is $\gamma_b$<62°−(32°·$h_x$), with respect to a respective radial position $h_x$, dimensioned from zero at a radially inner end to one at a radially outer end of a respective airfoil, viewed in conical sections and taken at the different radial positions $h_x$, through the leading and trailing edges, the stagger angle $\gamma_b$ being taken on a pressure side of each airfoil between a chord and the direction of rotation,
and wherein the plurality of airfoils includes a first airfoil and a second airfoil disposed adjacent to the first airfoil in the direction of rotation, the first and second airfoils being disposed relative to each other such that a ratio e/t, viewed in a conical section, results from
a smallest distance e taken on the pressure side of the first airfoil from a trailing edge of the first airfoil to a suction side of the second airfoil, and
a pitch t of the airfoils,
such that e/t is less than 0.31 (e/t<0.31).

12. The rotor blade ring according to claim 11, wherein at least one airfoil has a metal angle $\beta_1$, which for the at least one airfoil, at least in a radially outer 5% of a radial airfoil height h at a leading edge is greater than 50° ($\beta_1$>50°).

13. The rotor blade ring according to claim 11, wherein at least one airfoil has a metal angle $\beta_1$ which for the at least one airfoil, at least in a radially outer 5% of a radial airfoil height h at a leading edge, is smaller than 85° ($\beta_1$<85°).

14. The rotor blade ring according to claim 11, wherein the rotor blade ring is capable of an ADP speed of at least 8000 and at most 12000 rpm.

15. The rotor blade ring according to claim 11, in which a mean radius $r_m$ is at least 0.15 m and at most 0.6 m.

16. The rotor blade ring according to claim 11, wherein a ratio h/b obtained with a radial airfoil height h of a respective airfoil to an axial grid width b is at least 2 and at most 5.5 (2≤h/b≤5.5).

17. The rotor blade ring according to claim 11, wherein at least one airfoil has at a trailing edge, of the at least one airfoil, at least at a respective duct height of at least 10% of the radial duct extent, a downstream angle $\beta_2$ which is at least 14° and at most 18° (14°≤$\beta_2$≤18°).

18. A method of operating a low-pressure turbine of an aircraft gas turbine of a turbofan engine, the method comprising
providing a rotor blade ring that comprises a plurality of airfoils disposed consecutively in a direction of rotation, wherein each airfoil is disposed with a stagger angle $\gamma_b$, which is $\gamma_b$<62°−(32°·$h_x$), with respect to a respective radial position $h_x$, dimensioned from zero at a radially inner end to one at a radially outer end of a respective airfoil, viewed in conical sections and taken at the different radial positions $h_x$, through the leading and trailing edges, the stagger angle $\gamma_b$ being taken on a pressure side of each airfoil between a chord and the direction of rotation,
wherein the plurality of airfoils comprises a first airfoil and a second airfoil disposed adjacent to the first airfoil in the direction of rotation, the first and second airfoils being disposed relative to each other such that a ratio e/t, viewed in a conical section, results from
a smallest distance e taken on the pressure side of the first airfoil from a trailing edge of the first airfoil to a suction side of the second airfoil, and
a pitch t of the airfoils, such that e/t is less than 0.31 (e/t<0.31); and rotating the rotor blade ring at an ADP speed of at least 8000 rpm and at most 1200 rpm.

19. A guide vane ring for a low-pressure turbine of an aircraft gas turbine of a turbofan engine, the guide vane ring comprising:

a plurality of airfoils disposed consecutively in a direction of rotation, each airfoil being disposed with a stagger angle $\gamma_v$ less than 45° ($\gamma_v$<45°) over the entire height of the respective airfoil, the stagger angle $\gamma_v$ being taken on a pressure side of each airfoil between a chord and the direction of rotation, wherein the plurality of airfoils comprises a first airfoil and a second airfoil adjacent to the first airfoil in the direction of rotation, the first and second airfoils being disposed relative to each other such that a ratio e/t, viewed in a conical section, results from:

a smallest distance e taken on the pressure side of the first airfoil from a trailing edge of the first airfoil to a suction side of the second airfoil, and a pitch t of the airfoils, such that e/t is less than 0.31 (e/t<0.31), wherein e/t is less than 0.31 over the entire height of each of the airfoils.

* * * * *